US008765251B2

(12) United States Patent
Strait

(10) Patent No.: US 8,765,251 B2
(45) Date of Patent: Jul. 1, 2014

(54) SLIP RESISTANT ROOF UNDERLAYMENT

(75) Inventor: Mark C. Strait, Simi Valley, CA (US)

(73) Assignee: Kirsch Research and Development, LLC, Simi Valley, CA (US)

( * ) Notice: Subject to any disclaimer, the term of this patent is extended or adjusted under 35 U.S.C. 154(b) by 1406 days.

(21) Appl. No.: 11/459,265

(22) Filed: Jul. 21, 2006

(65) Prior Publication Data

US 2008/0020662 A1    Jan. 24, 2008

(51) Int. Cl.
    *B32B 5/26*    (2006.01)

(52) U.S. Cl.
    USPC .............. 428/141; 442/35; 442/43; 442/401; 442/398

(58) Field of Classification Search
    USPC .................. 442/35, 43, 401, 398; 428/141
    See application file for complete search history.

(56) References Cited

U.S. PATENT DOCUMENTS

| | | | |
|---|---|---|---|
| 3,663,350 A | 5/1972 | Stokes | |
| 4,491,617 A * | 1/1985 | O'Connor et al. | 442/32 |
| 4,585,682 A | 4/1986 | Colarusso et al. | |
| 4,806,300 A | 2/1989 | Walton et al. | |
| 5,523,357 A | 6/1996 | Peterson | |
| 5,593,766 A | 1/1997 | Woiceshyn | |
| 5,843,554 A | 12/1998 | Katz | |
| 5,979,133 A | 11/1999 | Funkhouser | |
| 6,308,482 B1 | 10/2001 | Strait | |
| 6,468,615 B2 * | 10/2002 | Weinstein et al. | 428/43 |
| 6,925,765 B2 * | 8/2005 | Fay et al. | 52/407.3 |
| 6,925,766 B2 * | 8/2005 | Di Pede | 52/408 |
| 2002/0136915 A1 * | 9/2002 | Sano et al. | 428/515 |
| 2004/0127120 A1 * | 7/2004 | Zanchetta et al. | 442/45 |
| 2005/0097857 A1 * | 5/2005 | Mehta et al. | 52/782.1 |

OTHER PUBLICATIONS

"Textile Glossary", definition of "scrim", dated 2001.*
William R. Bridendolph and Douglas E. Powell, "Advancements in Polypropylene for Extrusion Coating", 2001 Polymers, Laminations & Coatings Conference, (2001) ten pages.
James R. Beren, "Heterophasic Polypropylene Copolymer Resins for Extrusion Coating", 1994 Polymers, Laminations & Coatings Conference, (1994) pp. 97-102.
James R. Beren and Vito V. De3maio, "On-Line Melt Strength Enhancement of Polypropylene for Extrusion Coating", 2000 Polymers, Laminations & Coatings Conference, (2000), five pages.
Ananda M. Chatterjee, "Resin and Molecular Weight Distribution Effects on extrusion Coating of Polypropylene", copyright 1999 by Union Carbide Chemicals & Plastics Technology Corporation, (1999) eight pages.

* cited by examiner

*Primary Examiner* — Elizabeth Cole
(74) *Attorney, Agent, or Firm* — SoCal IP Law Group LLP; Mark A. Goldstein

(57) ABSTRACT

A roofing underlayment having a slip-resistant surface includes a woven polypropylene scrim laminated to a top layer made from a non-woven spun-bond polypropylene fabric. During lamination, the scrim is bonded to the top layer by a polypropylene coating that impregnates the scrim, thereby forming a structural bottom layer comprising the polypropylene-impregnated scrim. The non-woven fibers of the top layer provide a micro-textured, slip-resistant surface. A second polypropylene coating may be applied to the bottom surface of the bottom structural layer. An adhesive layer may optionally be applied either to the bottom surface of the bottom structural layer, or, if used, to the bottom surface of the second polypropylene coating.

19 Claims, 5 Drawing Sheets

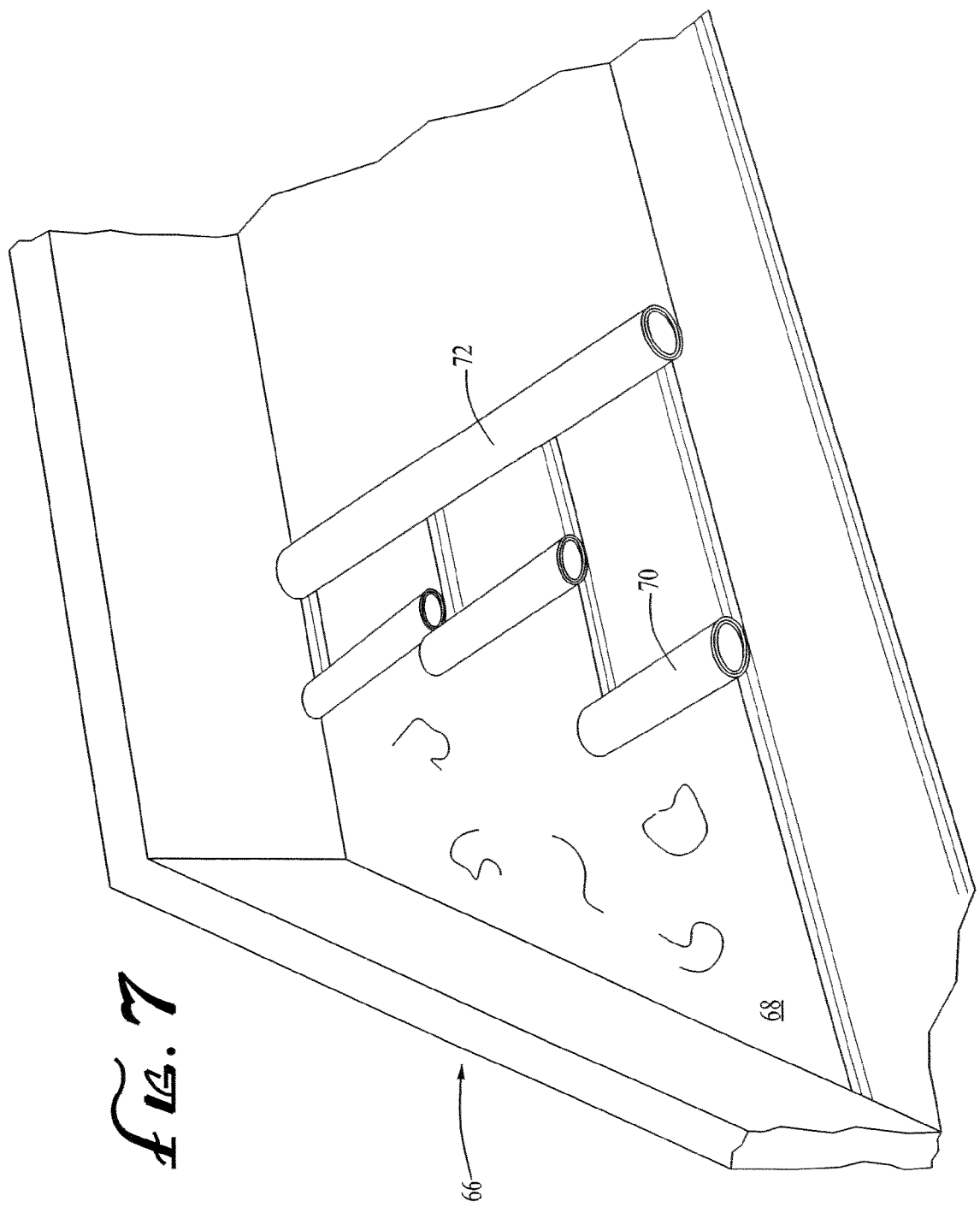

SLIP RESISTANT ROOF UNDERLAYMENT

CROSS-REFERENCE TO RELATED APPLICATION

Not Applicable

FEDERALLY-SPONSORED RESEARCH OR DEVELOPMENT

Not Applicable

BACKGROUND OF THE INVENTION

This invention relates, in general, to an underlayment for a roof structure, and more specifically, to a roof underlayment having a slip-resistant surface.

Roofing structures for buildings typically include an underlayment positioned between a roof support deck and an overlayment. The overlayment, such as asphalt shingles, tiles, wooden shakes, slate tiles, metal roofing, low-pitch polyurethane spray foam systems, or the like, is intended to provide protection from external weather conditions like wind, rainwater, and snowmelt. The underlayment is installed between the roof deck and the overlayment, and it further protects against moisture and other elements which may pass under the overlayment.

Underlayments have conventionally been produced by coating a layer of organic paper with a certain density of asphalt and are stored in rolls. However, conventional underlayments become slippery when exposed to fluids, such as rain or dew, or are covered in dust. Also, asphalt based roof underlayments are manufactured using a release agent, such as silica, to prevent the asphalt from sticking to itself in the roll. However, the release agent creates a slippery surface for workers installing asphalt based roofing felts. People installing roofs or working on the roof prior to the installment of the overlayment frequently slip on the exposed underlayment and may suffer injury as a result. A need therefore exists for a roofing underlayment having a slip resistant surface to reduce the chances of slipping on an underlayment when the underlayment is exposed to fluids or debris.

SUMMARY OF THE INVENTION

In accordance with a first embodiment of the present invention, a roofing underlayment having a slip resistant surface is provided that comprises a woven scrim made from polypropylene tapes or fibers, a top layer made from a non-woven, spun-bond polypropylene fabric, and a polypropylene coating applied between the scrim and the top layer. The polypropylene coating is impregnated into the weaves of the woven fabric of the scrim, forming a structural bottom layer with increased shear strength, abrasion resistance and lay flat quality. The non-woven top layer is deeply pressed into the coating layer, with the non-woven fibers of the top layer providing a micro-textured surface that exhibits improved traction and a more secure anchoring surface for adhesive foam, as compared to prior art underlayments. Pressing the non-woven top layer into the coating layer, instead of simply using the coating as a glue to bond the non-woven layer to the woven scrim, inhibits the fibers in the non-woven top layer from "pencil rolling" or pulling away from the surface of the roof underlayment.

This impregnation of the scrim with the polypropylene coating provides improved bonding with the non-woven fabric of the top layer, thereby reducing the chances of delamination of the two layers. Extrusion lamination is used to bond the layers together, creating the roofing underlayment, according to the first embodiment. The top surface of the finished roof underlayment may advantageously be surface treated by passing it under a "corona treater," which reduces static build-up that may cause production or quality problems, and which provides adhesion for printing as well as proper adhesion of polyurethane foam adhesives to bond with the non-woven surface layer of the roof underlayment.

In accordance with a second embodiment of the present invention, a roofing underlayment having a slip resistant surface is provided that comprises a scrim woven from polypropylene tapes or fibers, a top layer made from a non-woven spun-bond polypropylene fabric, a first polypropylene coating between the scrim and the top layer, and a second polypropylene coating applied to the bottom surface of a bottom structural layer formed by the impregnation of the scrim with the polypropylene of the first coating. As in the first embodiment, the first polypropylene coating is impregnated into the weaves of the woven scrim, forming a bottom structural layer with increased shear strength, abrasion resistance and lay flat quality.

As with the underlayment of the first embodiment, the underlayment of the second embodiment has a slip resistant micro-textured surface provided by the non-woven fibers of the top layer, which is deeply pressed into the first polypropylene coating above the woven scrim of the bottom layer during lamination. The micro-textured surface provides superior traction and improved anchoring for adhesive foam. Pressing the non-woven top layer into the first polypropylene coating above the bottom layer, instead of using the coating as a glue to bond the non-woven layer top layer to the woven bottom layer, reduces the tendency of the fibers of the non-woven top layer to "pencil roll" or pull away from the surface of the underlayment. Furthermore, forming the underlayment in this manner allows the underlayment to meet adhesive test requirement identified in ICC/ES AC152 PER ASTM 1623.

As mentioned above, the second embodiment employs a second polypropylene coating on the bottom surface of the bottom layer. The addition of the second coating on the bottom layer further strengthens the underlayment and creates an underlayment with a higher abrasion resistance. Additionally, the scrim of the bottom layer of the underlayment of the second embodiment is made from a heavier woven fabric than the scrim of the bottom layer of the underlayment of the first embodiment. However, the heavier woven fabric of the second embodiment can be used instead of the lighter woven fabric in the first embodiment as required by different roofing applications.

Both the first and second embodiments of the present invention are manufactured using an extrusion lamination process. Overlap lines and inner and outer layout lines can be printed on the underlayment to guide in the installation of the roof. The overlap lines indicate where to overlap succeeding strips of underlayment, and by how much, as the underlayment is installed from the bottom of the roof to the top of the roof. Once a first strip of the underlayment has been installed, the bottom edge of the subsequent underpayment strip aligns with the overlap line on the previous strip, providing the workers with the exact location to install the subsequent underlayment strip. As a result, the laying of shingles or other overlayment materials stays consistent all the way to the top.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of an exemplary embodiment. The illustrated embodiment is intended to illustrate, but not to limit the invention. The drawings include the following:

FIG. 7 is a perspective view of the slip-resistant roofing underlayment of FIG. 1 or FIG. 5 being installed on a commercial roof structure in accordance with the present invention.

DETAILED DESCRIPTION OF THE INVENTION

The following detailed description is of the best currently contemplated mode of carrying out the invention. The description is not to be taken in a limiting sense, but is made merely for the purpose of illustrating the general principles of the invention.

Figure 1:
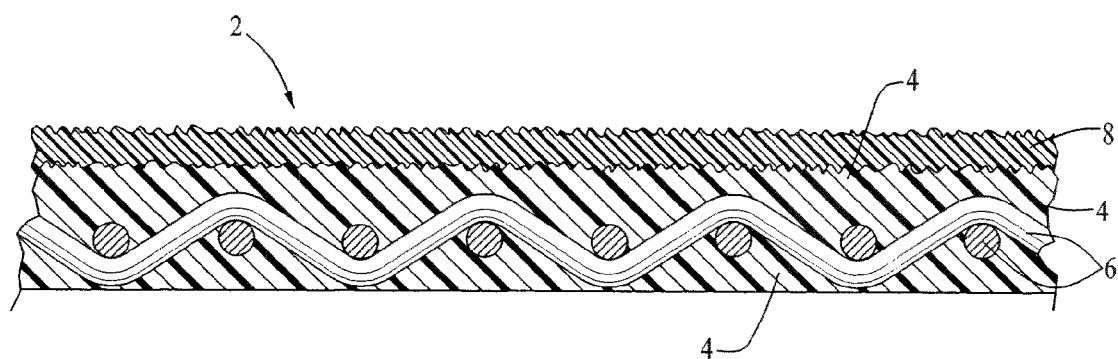
FIG. 1 is an enlarged, cross-sectional view of a slip-resistant roofing underlayment according to a first embodiment of the present invention.

Referring now to FIG. 1, an enlarged, cross-sectional view of a slip resistant roofing underlayment 2, according to a first embodiment of the present invention, is illustrated. The roofing underlayment 2 comprises a scrim 6 woven from polypropylene fibers or tapes, a top layer 8 made from a non-woven polypropylene fabric (spun-bond polypropylene), and a polypropylene coating 4 applied between the scrim 6 and the top layer 8 so as to bond the scrim and the top layer together. The thicknesses of the scrim fabric and the top layer 8 are selected depending on the needs of the particular roofing application.

During lamination, as described below, the polypropylene coating 4 is impregnated into the weaves of the scrim 6, creating a structural bottom layer comprising the scrim impregnated with the polypropylene coating. This impregnation of the scrim 6 with the polypropylene coating 4 also provides an improved bonding with the non-woven fabric of the top layer 8, thereby reducing the chances of delamination. Furthermore, the top layer 8 is pressed deeply into the coating 4 during the lamination process (described below), further strengthening the bond between the top layer 8 and the scrim 6. The non-woven fibers of the spun-bond top layer 8 provide a micro-textured surface that is waterproof as well as slip-resistant, even when exposed to moisture, such as rain or dew, or when covered with debris, such as dust, dirt, ceramic granules from asphalt shingles and small particles of material.

In addition to being slip resistant, the underlayment 2 is also resistant to thermal expansion or contraction, wrinkling, absorbing moisture, scarring or melting. It can withstand high temperatures in excess of 230° F. without softening, and it is ultraviolet resistant and contains antioxidants for long term resistance to heat. Furthermore, it resists rotting, drying out, or becoming brittle. The underlayment 2 also provides added protection against high winds and hail. Furthermore, the underlayment 2 is light in weight, at about 30 lbs. per typical 4 ft.×250 ft. roll.

Figure 2:
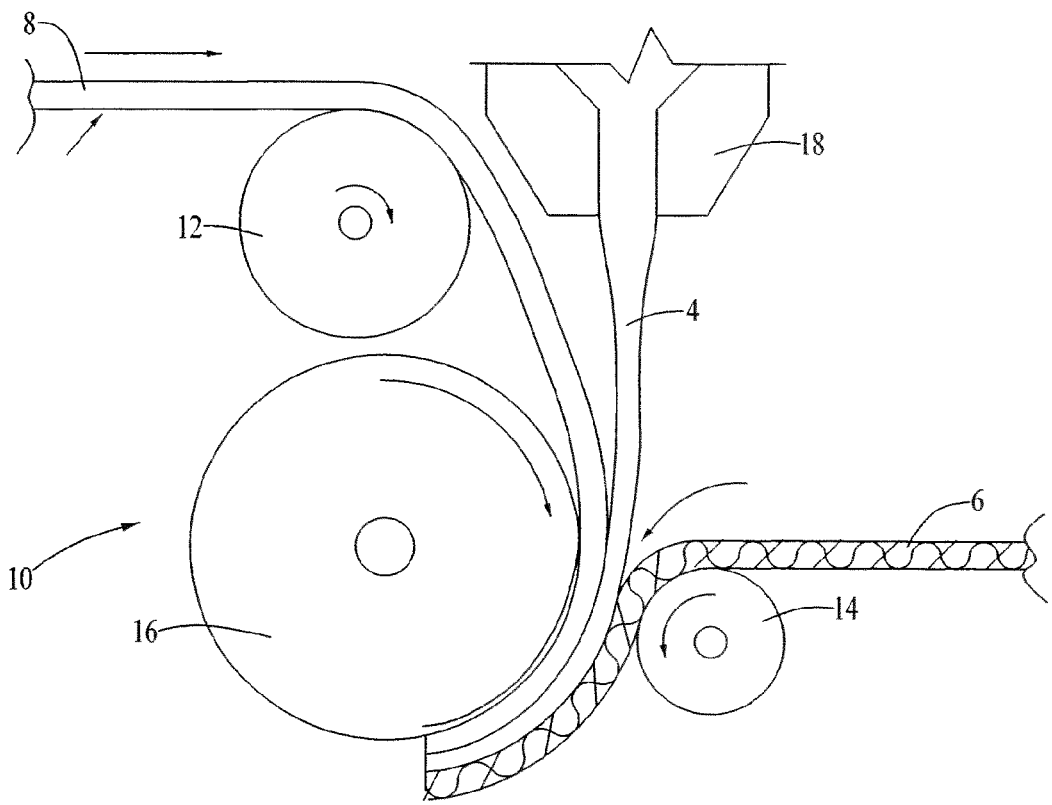
FIG. 2 is a schematic diagram of a laminating apparatus used in forming the slip-resistant roofing underlayment of FIG. 1.

The underlayment 2 of the first embodiment of the present invention is formed by an extrusion lamination process. FIG. 2 is a schematic diagram of a laminating apparatus 10 used in forming the roofing underlayment 2 of FIG. 1. The lamination apparatus 10 comprises a pair of master rolls (not shown) respectively containing a rolled sheet of the scrim material 6 and a rolled sheet of the top layer fabric 8. The top layer fabric 8 is passed over a guide roller 12 and then into a lamination nip sequence formed between a nip roller 14 and a chill roller 16, while the coating 4 is being extruded in a liquid state, from an extruder 18, between the layers 6, 8. Specifically, the top layer fabric 8 is laminated to the scrim fabric 6 as the extruded coating 4 is applied to the bottom side of the top layer fabric 8 just before the top layer fabric 8 and the scrim fabric 6 pass between the nip roller 14 and the chill roller 16. Thus, as the scrim fabric 6, the molten polypropylene coating 4, and the top layer fabric 8 pass between the nip roller 14 and the chill roller 16, the scrim fabric 6 and the top layer fabric 8 are pressed together, causing the polypropylene coating 4 to be impregnated into the woven fabric of the scrim 6 as the top layer fabric 8 is being laminated to the scrim 6. The amount of polypropylene coating 4 and the nip pressure between the nip roller 14 and the chill roller 16 should be sufficient to saturate the scrim fabric 6 and to press the top layer fabric 8 deeply into the polypropylene coating 4. The underlayment 2 is then transferred to a master roll (not shown) and then processed into finished rolls (not shown).

The underpayment 2 described above in accordance with the first embodiment is advantageously used as an underlayment for asphalt shingles. By using the underlayment 2 when installing asphalt shingles, the life of the roof is enhanced, as the underlayment provides long-term moisture protection, improved durability wind resistance, enhanced elimination of blow-off and resistance to hail damage. The underlayment 2 is thermally stable, with a melting point of 320° F., and is approved as an alternate to Type 15 and Type 30 roofing felts (asphalt coated paper based).

In the preferred embodiment, the top layer 8 is advantageously white or grey in color, as these colors keep the underlayment up to 30% cooler for workers and keep buildings cooler during construction in summer months, while black may be used in winter months to help increase snow and ice melt from the roof. Furthermore, additives can be added to the coating and/or any of the layers to protect the underlayment 2 from sun damage. Such additives may include, for example, ultra-violet protective additives to protect the underlayment while exposed prior to installation of the primary roof coverings and anti-oxidants to resist oxidation from heat cycling after the primary roof covering is installed. Additionally, additives such as EVA can be added to improve the lower temperature performance of the polypropylene resin formulation. These and other additives are well-know in the plastic additive industry, and are commercially available from companies such as Eastman Chemical Company and Techmer PM.

Figure 3:
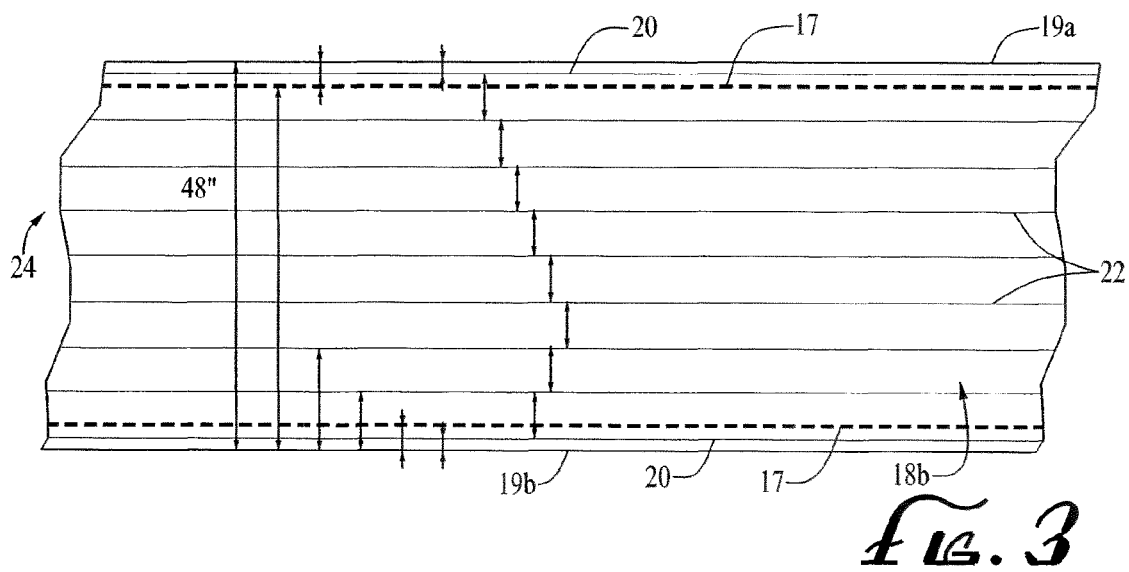
FIG. 3 is a partial top plan view of the slip-resistant roofing underlayment of FIG. 1, according to one aspect of the first embodiment.

FIG. 3 is a partial top plan view of a strip 24 of the roofing underlayment 2 of FIG. 1, according to one aspect of the first embodiment of the present invention. The top layer 8 of the underlayment strip 24 is printed with overlap lines 17 along its opposed edges for installing the underlayment strip 24.

The overlap lines 17 are preferably printed 3" from, and parallel with, the upper and lower edges 19a, 19b of the strip 24, for a strip that is of standard 48" width. Other distances from the edges may be used, depending on the width of the strip 24 and the size of the shingles in the overlayment. The overlap lines 17 indicate where to overlap succeeding strips 24 of underlayment, and by how much to overlap the succeeding strips of underlayment, as the underlayment is installed from the bottom of the roof to the top of the roof. Once a first strip 24 of the underlayment has been installed, a second strip 24 can be installed in a right-to-left or left-to-right direction, parallel and horizontal to the first strip 24 and so on, with subsequent underlayment strips 24 overlapping the previous strip up to the overlap line 17 on the upper edge 19a of the previous strip 24, providing workers with the exact location to install each strip 24 relative to the previous strip. The underlayment strip 24 is symmetrical top-to-bottom, so the installer does not have to start at the same side of the roof deck to install the strip 24.

In addition to the printed overlap lines 17, outer and inner layout lines 20, 22 are printed every 5.625" on the strips 24 to provide a consistent layout for each course of conventional metric asphalt shingles (not shown) from eave to ridge. In summary, the roof underlayment of the present invention has overlap lines 17 on the top and bottom horizontal longitudinal edges of the strip 24 along with outer and inner layout lines 20, 22 so that each and every course of shingles, from the starter course at the roof eave and the field courses from the eave to the ridge of the roof, is provided with the correct alignment line for the asphalt shingles over the course of the roof. As a result, the laying of the shingles stays consistent all the way to the top of the roof.

In the preferred embodiment, the underlayment strip 24 is 48 inches wide, and the overlap lines 17 are located 3 inches from the upper and lower edges 19a, 19b. Between the overlap lines 17 and each of the upper and lower edges 19a, 19b, the outer layout lines 20 and an array of parallel inner layout lines 22 are printed every 5.625 inches, starting 1.5 inches from the lower edge 19b and ending 1.5 inches from the upper edge 19a. The layout lines 20, 22 provide a guide for consistently laying the shingles. The top edge of each row of overlayment asphalt shingle elements aligns with either of the outer layout lines 20. By overlapping each underlayment by 3 inches and following the layout lines 20, 22, the overlayment elements will be consistently laid all the way to the top of the roof. In the preferred embodiment, metric asphalt shingles are used, as the dimensions of metric asphalt shingles conform to the layout lines 20, 22 on the underlayment strip 24. In alternative embodiments, any type of asphalt shingle, metal shingle, slate shingle, or tile shingle can be used, as the printed layout lines can be used as a straight edge to determine a predetermined distance that must be followed when installing a roofing unit that must be installed with a relative overlap to the manufacturer's installation instructions. The printed layout lines of the underlayment strip 24 of the present invention will aid in the speed and quality of installing a roof.

Figure 4:
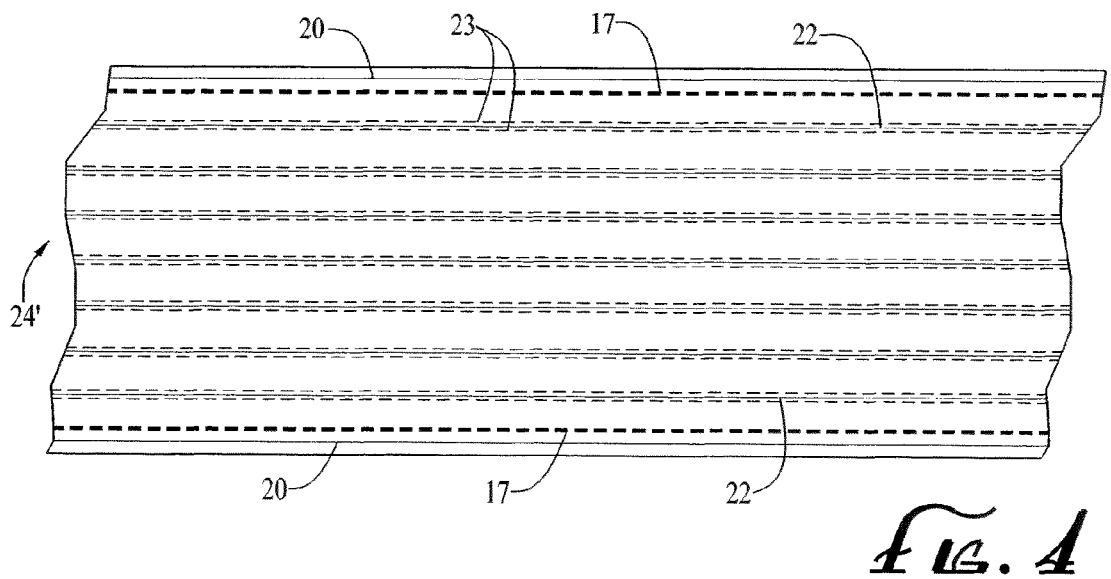
FIG. 4 is a partial top plan view of the slip-resistant roofing underlayment of FIG. 1, according to a second aspect of the first embodiment.

FIG. 4 is a partial top plan view of a strip 24' of the roofing underlayment of FIG. 1, according to a second aspect of the first embodiment of the present invention. As described above with reference to FIG. 3, the underlayment strip 24' includes overlap lines 17, and outer and inner layout lines 20 and 22. However, the underlayment strip 24' of FIG. 4 has the addition of one-inch adhesive strips 23 located above or below and parallel to the layout lines 20, 22. Additionally, the outer layout lines 20, which face the bottom side of a subsequent underlayment strip that overlaps a previous underlayment strip, allow for a sealing strip that bonds the subsequent underlayment strip 24 to the top side of previous underlayment strip 24. Thus, wind driven rain is inhibited from blowing between the horizontal longitudinal overlaps of underlayment strips 24.

Figure 5:
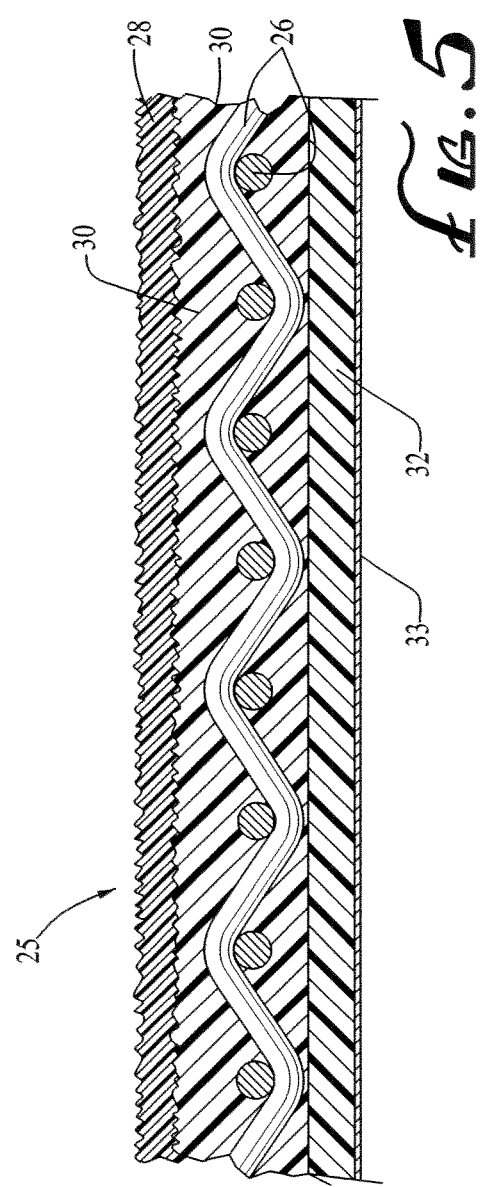
FIG. 5 is an enlarged, cross-sectional view of a slip-resistant roofing underlayment according to a second embodiment of the present invention.

FIG. 5 is an enlarged, cross-sectional view of a roofing underlayment 25 according to a second embodiment of the present invention. The roofing underlayment 25 of the second embodiment comprises a scrim 26 that is woven from polypropylene fibers or tapes, a top layer 28 made from a non-woven, spun-bond polypropylene fabric, and a first polypropylene coating 30 applied between the bottom layer 26 and the top layer 28. The first polypropylene coating 30 impregnates the fabric weave of the scrim 26 and bonds the top layer 28 and the scrim 26 together, as in the above-described first embodiment, while also forming a structural bottom layer comprising the scrim 26 impregnated with the polypropylene from the first polypropylene coating 30. The scrim 26 of the second embodiment may advantageously be made from a heavier woven fabric than the scrim 6 of the first embodiment, although the scrim 6 of the first embodiment can be made using the heavier woven fabric of the second embodiment as needed to improve the abrasion resistance and tensile strength, and to allow for installation using standard ⅜" roofing nails.

The underlayment 25 of the second embodiment is principally distinguished from the underlayment 2 of the above-described first embodiment by the addition of a second polypropylene coating 32 that is applied in liquid form (extrusion laminated) on the bottom surface of the bottom structural layer (the polypropylene-impregnated scrim 26). The addition of the second coating 32 on the bottom structural layer further strengthens the underlayment 25, increases its abrasion resistance, and provides for a synthetic roof underlayment that, when mechanically fastened with nails, provides nail sealability as per ASTM 1970 per ICBO AC 48 Severe Weather Climate Roof Underlayments standards.

As with the underlayment 2 in the first embodiment of the present invention, the underlayment 25 of the second embodiment is slip-resistant, as well as resistant to thermal expansion and contraction, wrinkling, absorbing moisture, scarring, and melting. Thus, it withstands high temperatures, and it resists rotting, drying out, or becoming brittle. The underlayment 25 also provides added protection against wind and hail. Furthermore, the underlayment 25 of the second embodiment of the present invention is relatively light in weight, at about 45 lbs. per typical 4 ft. by 250 ft. roll.

The conventional method of installing current synthetic polymer roof underlayments requires a plastic cap attached to a number 12 gauge nail shank. The caps provide a larger surface area to hold the current synthetic polymer roof underlayments to the conventional wood sheathing, plywood or OSB deck, as the heads of the larger nails are needed to increase the nail head-to-underlayment contact area, thus reducing the probability of tearing at the nails. Due to the high tensile strength of the underlayment 25 of the second embodiment of the present invention, however, standard ⅜ inch nails can be used for installation without the need for plastic caps. This feature speeds installation, as hand-driven ⅜" nails install faster without the plastic caps. In addition, a standard ⅜" coil gun can be used, which is the standard nail gun typically used by asphalt shingle installers. Thus, present invention obviates the need for a separate tool to install the underlayment, while providing better sealing at the nail head, and while also eliminating the dimpling of metal standing roof panels caused by plastic capped nails.

Alternatively, instead of nailing the underlayment 25 to the roof, the underlayment can be installed using an adhesive layer 33 (FIG. 5), such as a hot melt pressure sensitive adhesive, asphalt, sbs-modified asphalt, and/or butyl-modified adhesives known to those in the industry. In a preferred embodiment, a butyl-modified hot melt pressure sensitive adhesive made by Alpha Systems Inc., or a thermoplastic pressure sensitive hot melt adhesives made by Q'SO Inc. can be used. Other suitable adhesives are well-known and commercially available. The adhesive layer 33 is applied to the bottom surface of the second polypropylene coating 32 after the latter has hardened, and it and is typically covered with a removable film/split film release liner (not shown). When the underlayment 25 is installed, the film is peeled away from the underlayment 25 and the underlayment 25 is applied to the roof structure. By using an adhesive backing, the underlayment becomes mechanically bonded to the roof structure or to a mechanically fastened underlayment in accordance with the first or second embodiment of this invention, and it provides additional structural support to keep a roof intact during strong sustained winds. It should be noted that the underlayment 2 in accordance with the above-described first embodiment may include an adhesive layer like the adhesive layer 33 shown in FIG. 5. In the case of the first embodiment, the adhesive layer would be applied to the bottom surface of the bottom structural layer after the polypropylene of that layer had hardened.

The added strength of the underlayment 25 of the second embodiment and the non-woven polypropylene fabric allows for installing concrete or clay roofing tiles with polyurethane spray foam adhesive. The polyurethane foam is sprayed onto the surface of the underlayment and bonds with the surface and provides an anchor for concrete and clay roof tiles, which are then set into the foam.

The underlayment 25 of the second embodiment of the present invention is formed by an extrusion lamination process similar to that described above with reference to FIG. 2, with the additional steps being performed of applying the second polypropylene coating 32 and of passing the filled master roll through the laminating apparatus 10 for a second time for applying the adhesive layer 33 to the bottom surface of the bottom structural layer. The modifications to the apparatus and process described above with reference to FIG. 2 that are needed to manufacture the underpayment 25 in accordance with the second embodiment would be readily apparent to those of ordinary skill in the pertinent arts.

Figure 6:
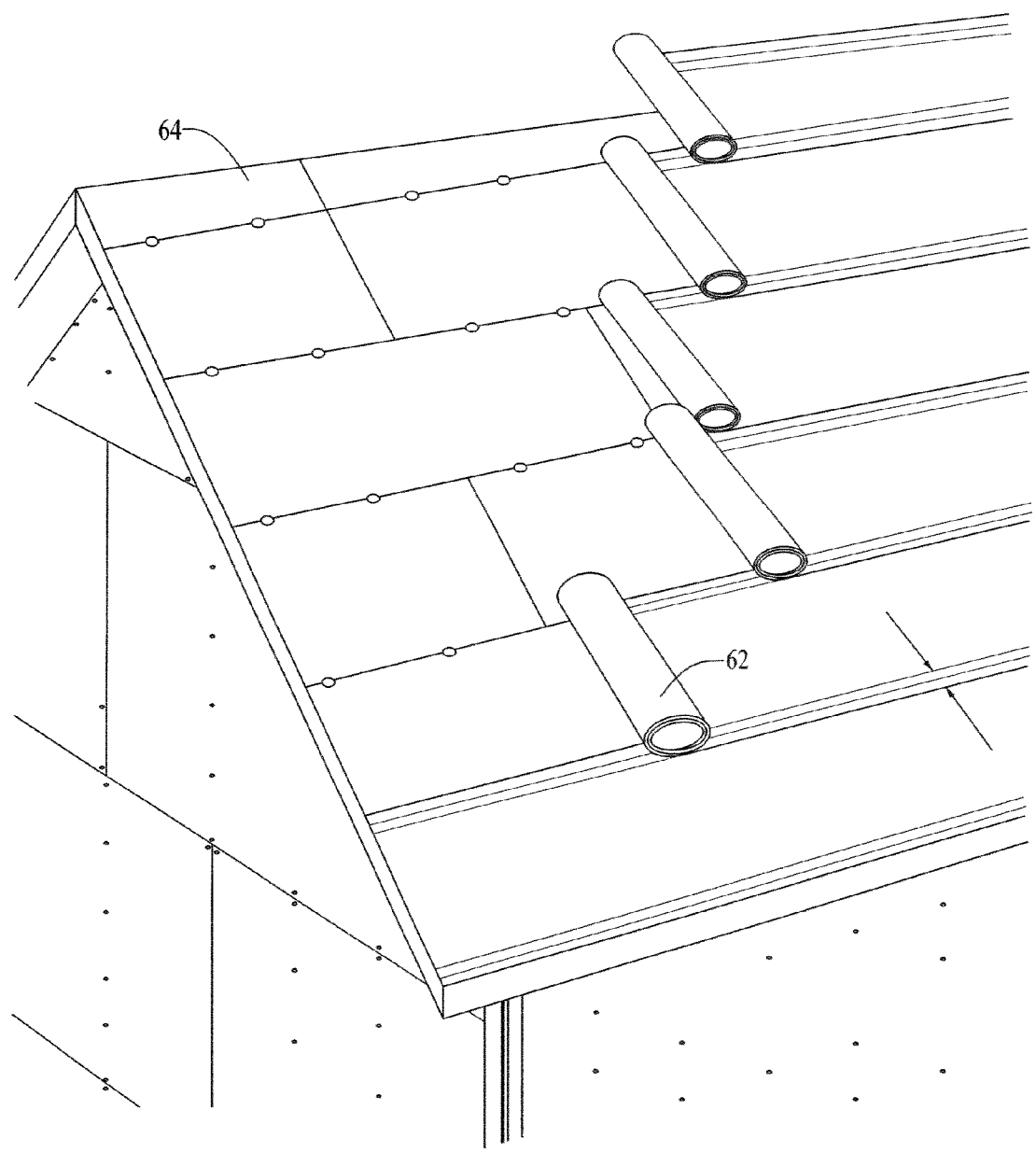
FIG. 6 is a perspective view of the slip-resistant roofing underlayment of FIG. 1 or FIG. 5 being installed on a residential or pitched roof structure in accordance with the present invention.

FIG. 6 is a perspective view of the roofing underpayment of FIG. 1 or FIG. 5 being installed on a residential or pitched roof structure. The roofing underlayment is flexible and may be formed into rolls 62 which can be simply unrolled over a roof support structure 64 to allow for easy installation.

FIG. 7 is a perspective view of the roofing underlayment of FIG. 1 or FIG. 5 being installed on a low-slope roof pitch commercial roof structure. Commercial grade roofing systems have a low-slope roof pitch surface 68, and rolls 70 of underlayment made in accordance with the first or second embodiment of this invention are unrolled on the roof surface 68, so that the underlayment may be mechanically fastened to an existing wood or metal low-slope deck, or installed using the pressure sensitive adhesive-coated version of the invention to concrete, steel or wood low-slope roofing. When installing a new roof on a commercial building with conventional underlayments, the original roof must sometimes be taken off, as TPO-type peel-and-stick commercial roofing materials do not attach well to the typical asphalt overlayment used in such applications. However, the underlayments of the present invention can be installed directly on top of the original commercial roof by use of mechanical fasteners. As a result, the original roof will not have to be removed, and the new roof 72, a TPO-type, peel-and-stick backed commercial grade roofing material, such as Everguard by GAF, can be installed directly on top of the original roof. To accommodate the larger surface area of the commercial roof, the width of the underlayment strips on the rolls is advantageously doubled to 96 inches.

The underlayments of the present invention can also be used with polyurethane spray foam (PSF) in low-slope commercial and residential roof applications, since the novel non-woven top layer of the present invention is particularly well-suited to bonding with PSF. PSF has been used for years in the roofing industry and is normally installed directly to the old roof surface or to a new roof deck, wall, and any number of other surfaces and applications. When re-roofing, the old roof is cleaned to remove rock, debris, and prepared prior to the application of the PSF. Where tar, asphalt, grease and other materials are present and do not allow for a proper bond when installing PSF, the underlayment of the present invention can be installed mechanically to allow for a clean surface to which the PSF can be applied and provides an anchor sheet. The underlayments of the present invention reduce the labor and materials required to properly clean the existing roof while providing a superior attachment sheet to the roof deck structure. In the case of a roof tear-off at a later date, it also allows for easier of removal with standard tear-off equipment, because PSF is difficult to remove when applied directly to a roof deck. Additionally, the adhesive backed underlayment of the present invention provides a level surface when installed over a fluted metal deck allowing for a flat surface on which to apply PSF instead of the conventional applications which may require the PSF to be used to fill in the flutes, which is a time consuming and difficult task if the installer is required to create a level and/or low-slope surface. The underlayments described in this invention can be installed on walls and other surfaces and other applications to which PSF can be applied.

Although the present invention has been described with reference to specific embodiments, these embodiments are illustrative only and not limiting. Many other applications and embodiments of the present invention will be apparent in light of this disclosure and a number of variations and modifications of the specific preferred embodiment disclosed herein will suggest themselves to those skilled in the pertinent arts. Such variations and modifications are considered to be within the spirit and scope of the present invention, as defined in the following claims.

What is claimed is:

1. A roofing underlayment, comprising:
    a scrim formed from a woven polypropylene fabric;
    a top layer made from a non-woven spun-bond polypropylene fabric; and
    a polypropylene coating consisting of polypropylene, the polypropylene coating applied in liquid form to bond the scrim to the top layer and to saturate the woven fabric of the scrim to form a waterproof bottom structural layer,
    wherein the top layer is pressed into the polypropylene coating of the bottom structural layer to form a micro-textured surface.

2. The roofing underlayment of claim 1, further comprising a second polypropylene coating on the bottom surface of the bottom structural layer.

3. The roofing underlayment of claim 1, further comprising an array of guidelines printed on the top layer.

4. The roofing underlayment of claim 3, wherein the underlayment is in the form of a strip having a pair of parallel edges, and wherein the array of guidelines comprises:
    an overlap line printed parallel to and adjacent each of the edges; and an array of substantially parallel layout lines between the edges.

5. The roofing underlayment of claim 4, wherein the array of layout lines includes an outer layout line between each of the overlap lines and the edge adjacent thereto.

6. The roofing underlayment of claim 2, further comprising an array of guidelines printed on the top layer.

7. The roofing underlayment of claim 6, wherein the underlayment is in the form of a strip having a pair of parallel edges, and wherein the array of guidelines comprises:
   an overlap line printed parallel to and adjacent each of the edges; and
   an array of substantially parallel layout lines between the edges.

8. The roofing underlayment of claim 7, wherein the array of layout lines includes an outer layout line between each of the overlap lines and the edge adjacent thereto.

9. The roofing underlayment of claim 1, wherein the bottom structural layer has a bottom surface, and wherein the underlayment further comprises an adhesive layer on the bottom surface of the bottom structural layer.

10. The roofing underlayment of claim 2, wherein the bottom structural layer has a bottom surface, and wherein the underlayment further comprises an adhesive layer on the bottom surface of the bottom structural layer.

11. A roofing underlayment, comprising:
   a top layer of non-woven spun-bond polypropylene fabric; and
   a waterproof bottom structural layer laminated to the top layer, the bottom structural layer comprising a woven polypropylene scrim and a polypropylene coating consisting of polypropylene, the polypropylene costing applied as a liquid to saturate the scrim and bond the scrim to the top layer, wherein the top layer is pressed into the polypropylene coating of the bottom structural layer to form a micro-textured surface.

12. The roofing underlayment of claim 11, wherein the bottom structural layer has a bottom surface, and wherein the polypropylene coating is a first polypropylene coating, the underlayment further comprising a second polypropylene coating applied to the bottom surface of the bottom structural layer.

13. The roofing underlayment of claim 12, further comprising an adhesive layer applied to the second polypropylene coating.

14. The roofing underlayment of claim 11, further comprising an array of guidelines printed on the top layer.

15. The roofing underlayment of claim 14, wherein the underlayment is in the form of a strip having a pair of parallel edges, and wherein the array of guidelines comprises:
   an overlap line printed parallel to and adjacent each of the edges; and
   an array of substantially parallel layout lines between the edges.

16. The roofing underlayment of claim 15, wherein the array of layout lines includes an outer layout line between each of the overlap lines and the edge adjacent thereto.

17. The roofing underlayment of claim 12, further comprising an array of guidelines printed on the top layer.

18. The roofing underlayment of claim 17, wherein the underlayment is in the form of a strip having a pair of parallel edges, and wherein the array of guidelines comprises:
   an overlap line printed parallel to and adjacent each of the edges; and
   an array of substantially parallel layout lines between the edges.

19. The roofing underlayment of claim 18, wherein the array of layout lines includes an outer layout line between each of the overlap lines and the edge adjacent thereto.

* * * * *